United States Patent
Brueck et al.

(10) Patent No.: US 6,519,861 B1
(45) Date of Patent: Feb. 18, 2003

(54) MECHANICAL CENTERING APPARATUS AND METHOD

(75) Inventors: Guenter Brueck, Midland (CA); Joerg Hollmann, Nolalu (CA); Kevin Wagner, Victoria Harbor (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/564,761

(22) Filed: May 4, 2000

(Under 37 CFR 1.47)

(51) Int. Cl.[7] .............................................. G01D 21/10
(52) U.S. Cl. .............................. 33/507; 33/200; 33/520; 33/644; 82/170
(58) Field of Search .......................... 33/507, 520, 549, 33/550, 551, 552, 553, 554, 710, 711, 28, 200, 644, 543, 555.1; 82/170; 279/133; 73/65.01

(56) References Cited

U.S. PATENT DOCUMENTS

| | | | | |
|---|---|---|---|---|
| 1,727,889 A | * | 9/1929 | McCabe | 451/460 |
| 2,005,106 A | * | 6/1935 | Peterson | 33/520 |
| 3,470,739 A | * | 10/1969 | Takafuji et al. | 73/159 |
| 3,604,248 A | * | 9/1971 | Altmann et al. | 73/66 |
| 4,527,056 A | * | 7/1985 | Burkhardt et al. | 250/237 G |
| 4,651,438 A | * | 3/1987 | Hutter et al. | 33/550 |
| 4,676,004 A | * | 6/1987 | Nakamura et al. | 33/200 |
| 4,776,101 A | * | 10/1988 | Ishibai | 33/507 |
| 4,903,413 A | * | 2/1990 | Bellwood | 33/551 |
| 4,938,489 A | * | 7/1990 | Nemirovsky | 269/156 |
| 4,941,291 A | * | 7/1990 | Brueck | 384/1 |
| 5,222,421 A | * | 6/1993 | Ushiro | 279/126 |
| 5,267,380 A | * | 12/1993 | Ronge et al. | 279/126 |
| 5,483,347 A | * | 1/1996 | Hollmann | 250/227.11 |
| 5,535,143 A | * | 7/1996 | Face | 702/165 |
| 5,561,242 A | * | 10/1996 | Naumann et al. | 73/65.01 |
| 5,678,963 A | * | 10/1997 | Heimann | 409/131 |
| 5,926,781 A | * | 7/1999 | Scott | 33/503 |
| 6,062,933 A | * | 5/2000 | Kasukawa et al. | 269/156 |
| 6,151,791 A | * | 11/2000 | Shimazutsu et al. | 33/552 |
| 6,327,788 B1 | * | 12/2001 | Seddon et al. | 33/543 |

FOREIGN PATENT DOCUMENTS

GB          2093753 A     *  9/1982

* cited by examiner

Primary Examiner—Diego Gutierrez
Assistant Examiner—R. Alexander Smith
(74) Attorney, Agent, or Firm—William C. Schubert; Glenn H. Lenzen, Jr.

(57) ABSTRACT

A workpiece (22) having a periphery is centered using a centering apparatus (20) having a workpiece spindle (24, 28) operable to rotate the workpiece (22) about a rotational axis (26), and a centering head (29). The centering head (29) includes a mount (30) movable in a movement direction lying in a plane (40) perpendicular to the rotational axis (26), and generally along a radial line (38) extending outwardly from the rotational axis (26). A swivel head (32) is pivotably supported on the mount (30) and is pivotable about a pivot axis (46) parallel to the rotational axis (26). The swivel head (32) has a pair of bearings (66) spaced apart along a direction lying generally perpendicular to the movement direction, with the bearing axis of each bearing (46) parallel to the rotational axis (26). A distance measuring device (34) is operable to measure the distance between the periphery of the workpiece (22) and a measurement location on the mount (30). The method includes mounting the workpiece (22) on the spindle (24, 28), positioning the centering head (29) at a location adjacent to the periphery (82) of the workpiece (22), rotating the spindle (24, 28) to rotate the workpiece (22), and measuring a runout curve using the distance measuring device (34). The centering head (29) is moved to contact the bearings (46) to the workpiece (22). The workpiece (22) is pushed with the bearings (46) in a direction and by an amount so as to reduce a constant term of the runout curve toward zero.

17 Claims, 5 Drawing Sheets

MECHANICAL CENTERING APPARATUS AND METHOD

BACKGROUND OF THE INVENTION

This invention relates to the centering of an article about its true rotational center, and, more particularly, to a mechanical apparatus and method to achieve such centering.

In a number of fields, it is important to position an article so that it rotates precisely about its rotational center, taken to be its center of symmetry. In one example, optical lenses are sometimes ground to specifications of the wedge angle between the opposite faces of the lens. In order to measure the wedge angle, a lens must be positioned precisely so that its true center is known, and the lens is rotated about that center. For such applications, the center of rotation must be determined to an accuracy of better than about 1 micrometer.

The rotational centering of the lens is complicated by the fact that the lens is often not perfectly round in transverse section perpendicular to the axis of rotation, due to limitations in the manufacturing processes. That is, the lens may be fabricated such that it is slightly oblong in transverse section. The lens therefore cannot be centered simply based on the measuring and positioning of its outer periphery.

The same problem of precise rotational centering arises in other fields as well. Rotating elements such as shafts, machine parts, flywheels, and other articles must be centered to avoid excessive vibration and damage during operation.

There is therefore a need for a highly accurate approach to the rotational centering of articles. The present invention fulfills this need, and further provides related advantages.

SUMMARY OF THE INVENTION

The present invention provides a method for the rotational centering of an article, and apparatus utilized in practicing the method. The present approach is highly precise, achieving centering to accuracies better than 1 micrometer. The apparatus tolerates misalignments that otherwise would prevent precise centering. The technique may be automated and used in an iterative fashion. The centering apparatus may be scaled to any required size, and the approach is therefore applicable to a wide range of centering problems.

In accordance with the invention, a centering apparatus used in conjunction with a workpiece having a periphery comprises a workpiece spindle operable to rotate the workpiece about a rotational axis, and a centering head. The centering head comprises a mount movable in a movement direction lying in a plane perpendicular to the rotational axis. The movement direction is generally a radial line extending outwardly from the rotational axis. The centering head further includes a swivel head pivotably supported on the mount and pivotable about a pivot axis parallel to the rotational axis. The swivel head has a pair of bearings spaced apart along a direction lying generally perpendicular to the movement direction, with each bearing having a bearing axis parallel to the rotational axis. Preferably, the centering head further includes a distance measuring device operable to measure the distance between the periphery of the workpiece and a measurement location on the mount.

A method for centering the workpiece comprises mounting the workpiece on the spindle, positioning the centering head at a location adjacent to the periphery of the workpiece, rotating the spindle to rotate the workpiece, and measuring a runout curve using the distance measuring device of the centering head. The runout curve has a constant component and a variable component. The method further includes moving the centering head along the movement direction until the bearings contact the workpiece, and pushing the workpiece with the bearings in a direction and by an amount so as to reduce the constant component of the runout curve toward zero. The amount and direction of pushing the workpiece may be precisely calculated and applied, or approximated and the method applied iteratively to reach the desired degree of accuracy of the rotational centering.

The centering head is structured so that it tolerates slight misalignments. It is otherwise difficult to align and move the centering head perfectly along a radial movement direction, to the accuracies required to achieve the desired centering. In the present approach, the pair of bearings on the centering unit provide a pushing engagement that remains operable even if the centering head is slightly displaced from or angularly misaligned with the exact radial direction from the rotational axis of the spindle.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
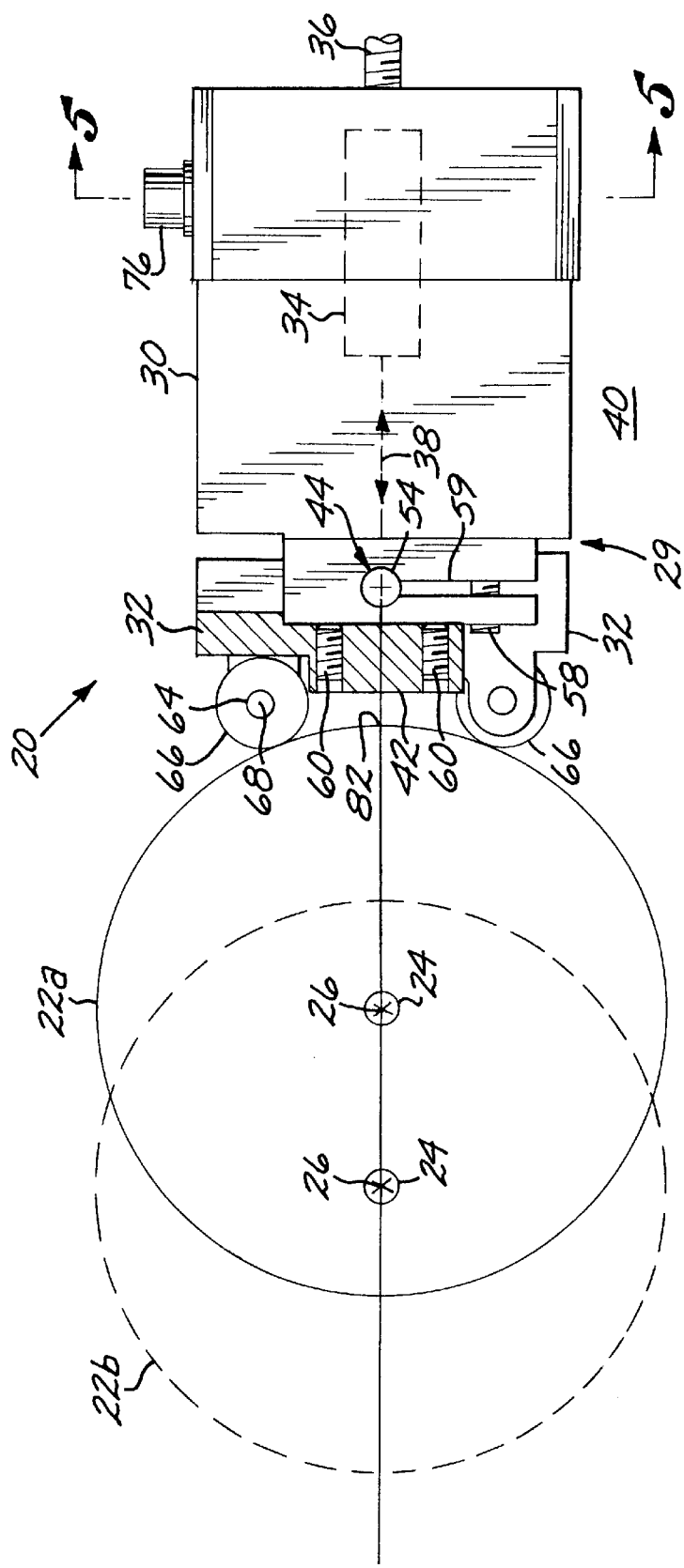
FIG. 1 is a plan view of a spindle, workpiece, and centering head, with the centering head partially in section.
Figure 2:
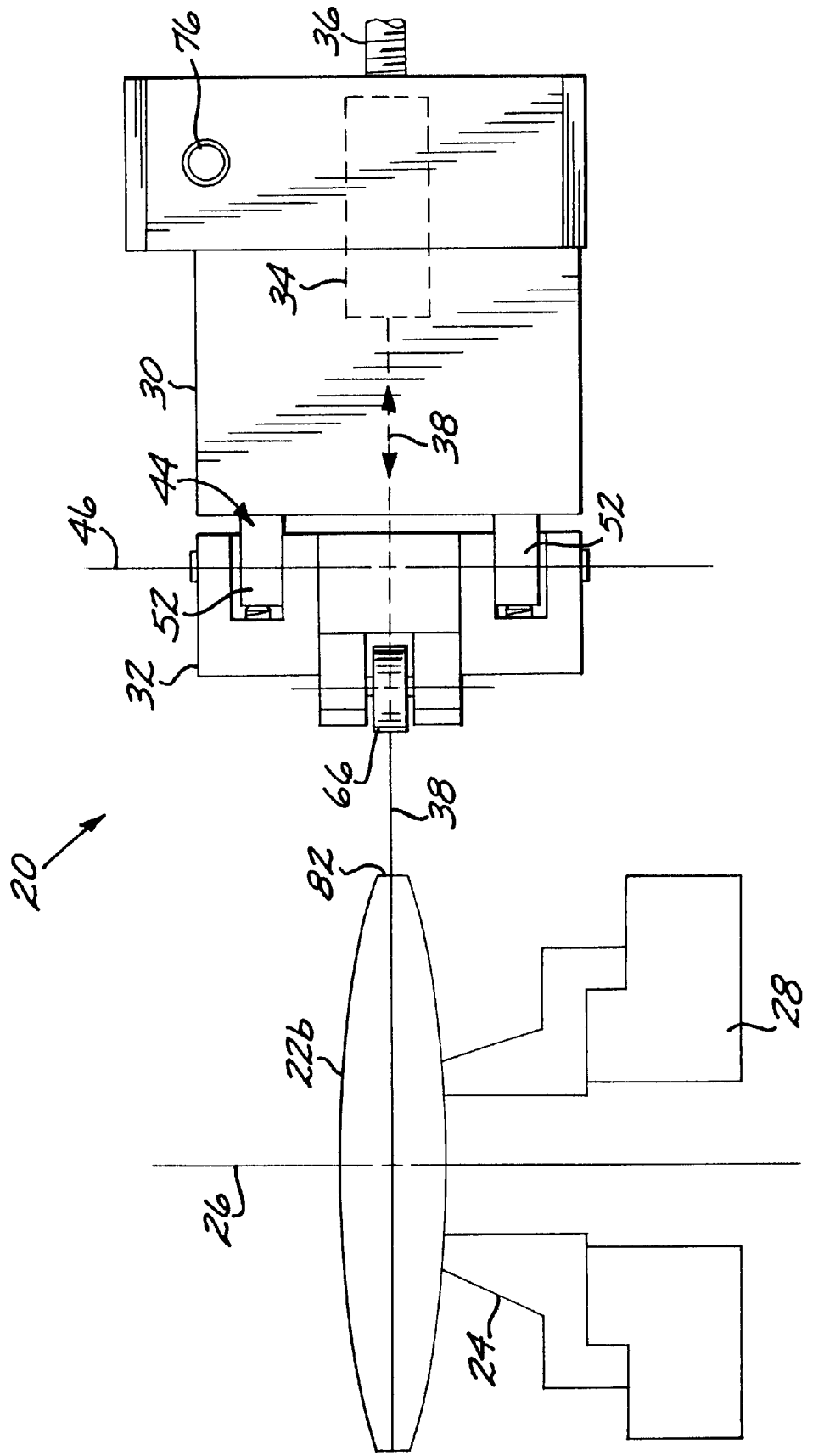
FIG. 2 is an elevational view of the spindle, workpiece, and centering head.

FIGS. 1 and 2 illustrate a centering apparatus 20, and a workpiece 22 that is to be centered. In a case of interest to the inventors, the workpiece 22 is a glass optical lens that is approximately, but not necessarily exactly, round in plan view, as shown in FIG. 1. The workpiece 22 is supported on a support/holder 24 that is mounted on a rotational air bearing 28, which rotates about a rotational axis 26. The support/holder 24 and the rotational air bearing 28 together constitute a spindle for rotating the workpiece 22, in this case the optical lens, about the rotational axis 26. During operation, the movable centering head portion of the centering apparatus 20 is sometimes contacting the workpiece 22, as shown for the workpiece 22a drawn in solid lines in FIG. 1. The movable centering head portion of the centering apparatus 20 is instead sometimes separated from the workpiece 22, as shown for the workpiece 22b drawn in dashed lines in FIG. 1. Only the separated workpiece positioning is shown in FIG. 2 for clarity.

The centering apparatus 20 includes a centering head 29 including a mount 30, a swivel head 32, and a distance measuring device 34 supported within the mount 30. The mount 30 is supported on a drive 36, here illustrated as a worm drive which may be turned by hand or a motor. The centering head 29 is movable along a movement axis 38 which lies in a plane 40 (the plane of the illustration in FIG. 1). The movement axis 38 is generally along a radial line extending outwardly in the plane 40 from the rotational axis 26. (That is, the movement axis 38 is perpendicular to the rotational axis 26.) As used in this context of the movement axis 38, "generally" means that the movement axis 38 is approximately, but not necessarily exactly, coincident with a radius extending outwardly from the rotational axis 26 (i.e., the spindle center). This situation often arises in practice, because of the high accuracies required in the present apparatus, but which are often difficult to achieve because they are smaller than conventional machining tolerances. A virtue of the present design of the mount 30 and the swivel head 32 is the ability to tolerate slight misalignments of the movement axis 38 from the spindle center. The centering head 29 is moved along this movement axis 38 toward and into contact with the workpiece 22 to reach the position indicated by the solid lines of the workpiece in FIG. 1, and away from the workpiece 22 to reach the position indicated by the dashed lines of the workpiece.

Figure 3:
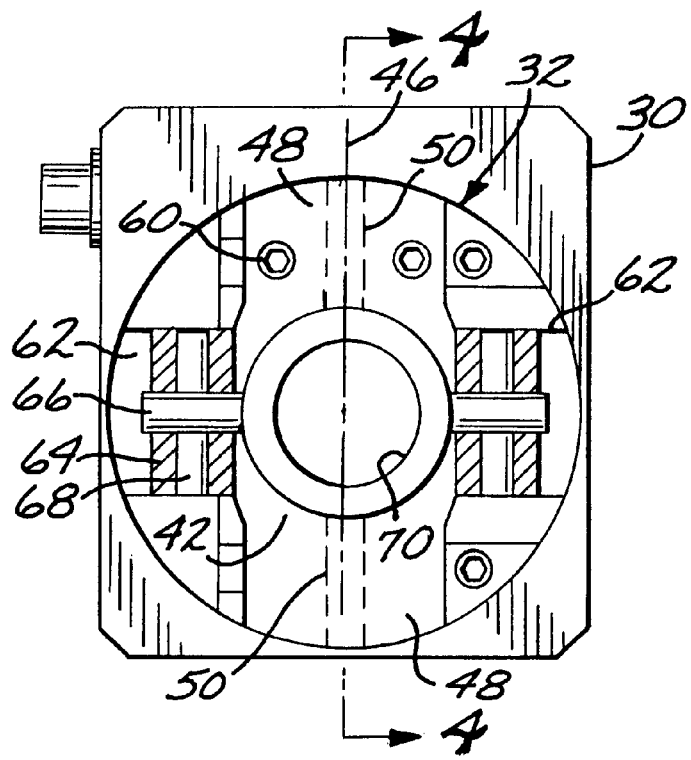
FIG. 3 is an elevational front view of the centering head.
Figure 4:
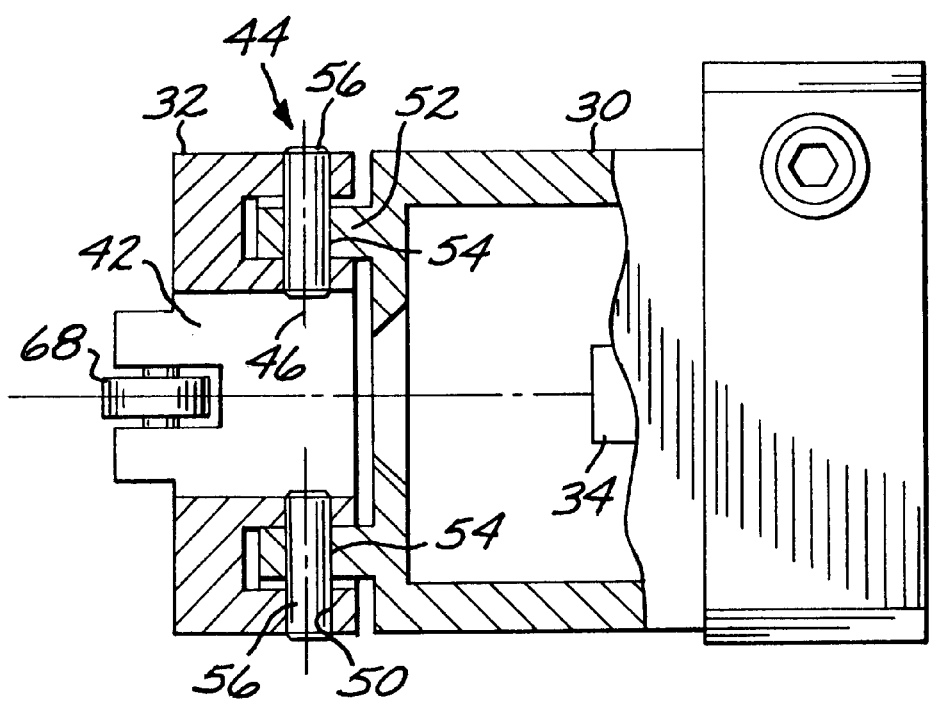
FIG. 4 is a sectional view of the centering head, taken along line 4—4 of FIG. 3.

The swivel head 32 includes a central body 42 that is pivotably connected to the mount by a pivot structure 44, shown in further detail in FIG. 4. The pivot structure 44 permits the swivel head 32 to pivot about a pivot axis 46 that is parallel to the rotational axis 26. The swivel head 32, shown in further detail in FIG. 3, includes two perpendicular arms 48 which extend outwardly (in opposite directions) from the central body 42 in a direction perpendicular to the plane 40. A pivot bore 50 extends through each of the perpendicular arms 48 coincident with the pivot axis 46. Two pivot supports 52 with support bores 54 therethrough extend outwardly from the mount 30. Two pivot pins 56 extending through the bores 50 and 54 pivotably connect the swivel head 32 to the pivot supports 52 of the mount 30, so that the swivel head 32 may pivot about the pivot axis 46.

One or both of the support bores 54 may be slotted perpendicular to the movement axis 38, as shown in FIG. 1. Set screws 58 engaged to the mount 30 are provided to control the width of the gap of the slot 59, thereby reducing the diameter of the support bores 54 to control the amount of force required to accomplish the pivoting of the swivel head 32 relative to the mount 30.

Two limiting set screws 60 extend through the central body 42 on either side of the pivot axis 46. The limiting set screws 60 are of sufficient length to contact on their ends, but not threadably engage, a front face of the mount 30. These limiting set screws 60 may be set to limit the amount of pivoting of the swivel head 32 permitted about the pivot axis 46.

Two parallel arms 62 extend outwardly from the central body 42 in a direction parallel to the plane 40. The parallel arms 62 are therefore perpendicular to the perpendicular arms 48, as seen in FIG. 3. A bearing bore 64 extends through each of the parallel arms 62 at a location laterally separated from the central body 42. The bearing bores 64 extend parallel to the rotational axis 26 and the pivot axis 46. A roller bearing 66 is supported in each bearing bore 64 by a bearing pin 68, so that the outer surface of the roller bearing 66 lies parallel to the plane 40.

An aperture 70 extends through the central body 42 of the swivel head 32 in the center of the arms 48 and 62. The aperture 70 provides a line of sight from the workpiece 22 to the distance measuring device 34 in the mount 30.

Figure 5:
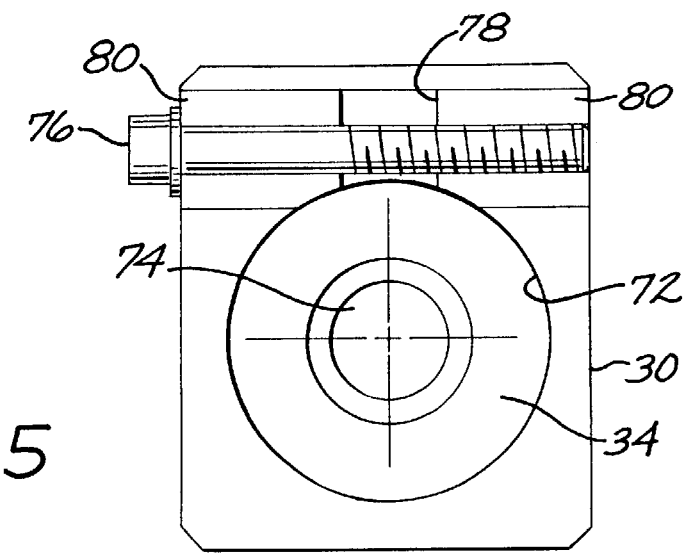
FIG. 5 is a sectional view of the centering head, taken along line 5—5 of FIG. 1.

The distance measuring device 34 is supported in the mount 30 in the manner shown in FIG. 5. A mount bore 72 extends through the mount 30 coincident with the movement axis 38. The mount bore 72 is sufficiently large to receive the distance measuring device 34, including its optics, therein. An aperture stop 74 is positioned to protect the sensor in the distance measuring device 34 from stray light. To retain the distance measuring device 34 in the mount bore 72, a pair of sleeves 80 are positioned within a transverse bore extending transversely through the mount 30 and a segment of the mount bore 72. The sleeve 80 on the left in FIG. 5 is internally smooth, and the sleeve 80 on the right in FIG. 5 is internally threaded. A set screw 76 is inserted through the sleeve 80 on the left and threadably engaged to the sleeve 80 on the right. The set screw 76 is tightened to draw the face 78 of the sleeve 80 on the right toward the head of the set screw. The portions of the sleeves 80 contacting the periphery of the measuring device 34 are wedge shaped, and tighten against the periphery of the measuring device 34 to retain it within the mount 30.

The distance measuring device 34 measures the distance from that location on a periphery 82 of the workpiece 22 which is intersected by the movement axis 38 to some defined location on the mount 30, such as the location of the distance measuring device 34. The distance measuring device 34 may be of any operable type. In a preferred approach, the image of the periphery is focused by an objective lens onto a sensor, and the focus of the sensor is adjusted to determine the distance. The preferred distance measuring device is described more fully in U.S. Pat. No. 5,483,347, whose disclosure is incorporated by reference. Other types of operable distance measuring devices include, for example, ultrasonic and laser ranging devices.

Figure 6:
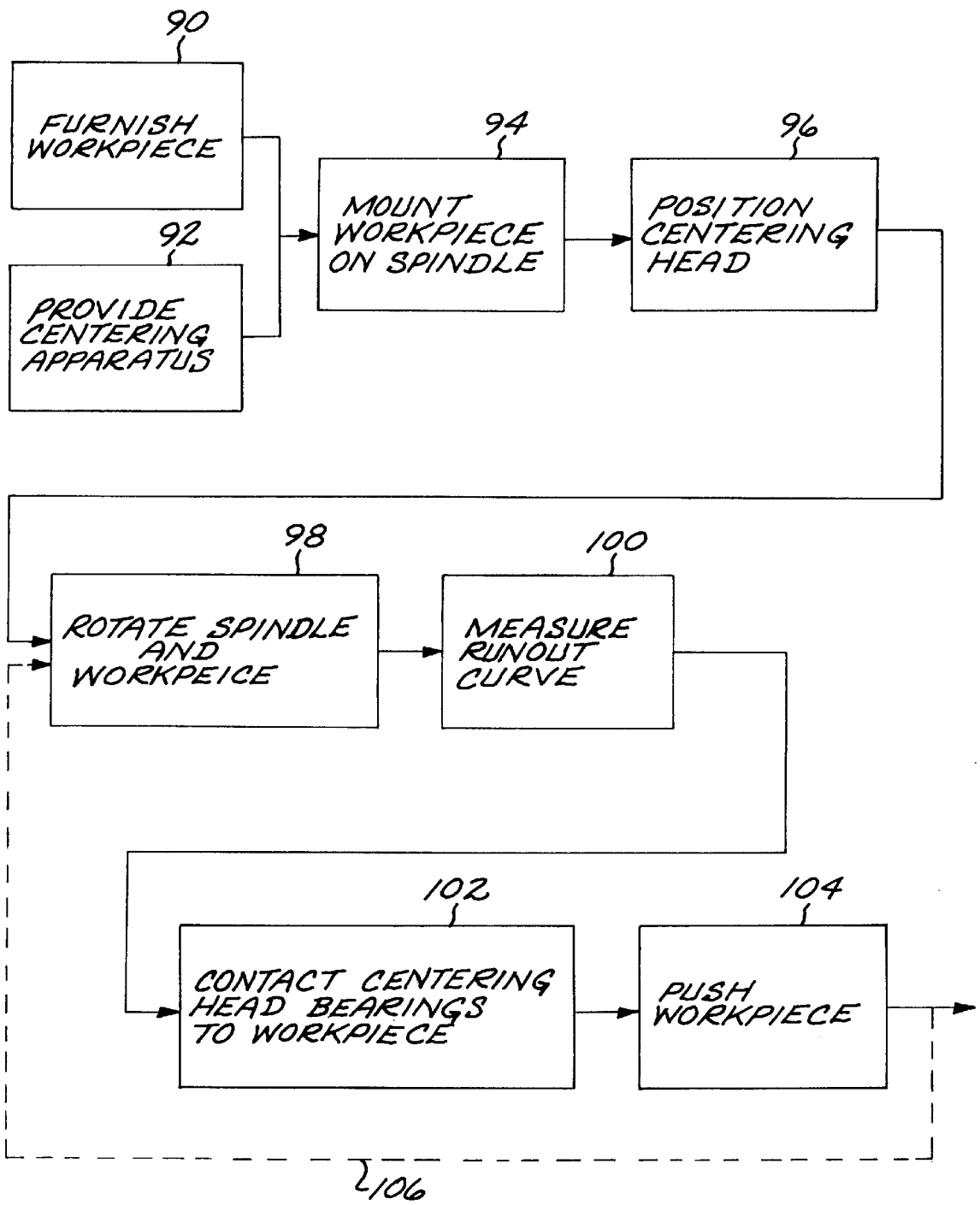
FIG. 6 is a block flow diagram of an approach for centering the workpiece.

FIG. 6 is a flow diagram of an approach for centering the workpiece 22 relative to the rotational axis 26. The workpiece is furnished, numeral 90, and the centering apparatus, preferably as described above, is provided, numeral 92. The workpiece 22 is mounted on the spindle, and in the illustrated case placed onto the support/holder 24, numeral 94. The centering head 29 is positioned at a location adjacent to but separated from the workpiece 22b, as shown in FIG. 1, so that the roller bearings 66 do not contact the workpiece 22b, numeral 96. The spindle 24 and thence the workpiece 22b are slowly rotated, numeral 98.

Figure 7:
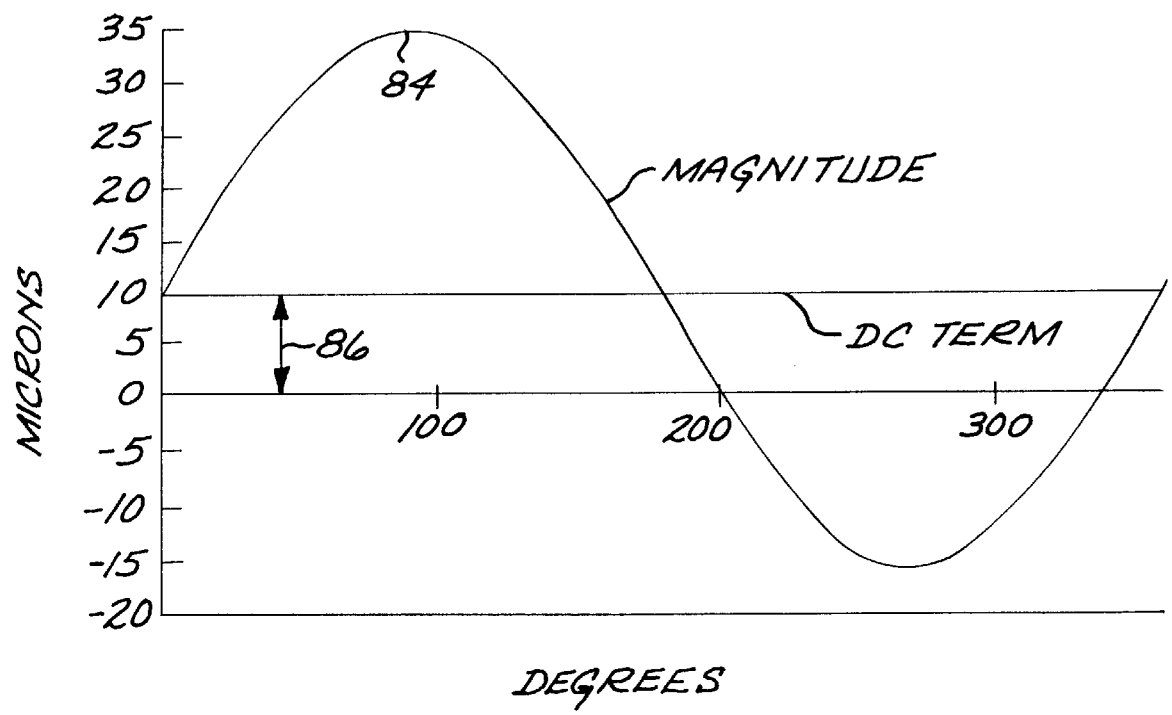
FIG. 7 is a graph of workpiece runout as a function of an angle of rotation of the workpiece.

The distance to the periphery 82 of the workpiece 22b is measured with the distance measuring device 34, numeral 100. A plot of distance as a function of angular position is prepared, as shown in FIG. 7. Although the workpiece 22b is fabricated to be as nearly circular as possible, it is typically somewhat non-circular due to manufacturing limitations. FIG. 7 is a measured runout curve for a lens workpiece 22b. The runout may be characterized as having two terms, a constant ("DC") term and an angularly variable term. The constant term is a function of the position of the workpiece 22 relative to the rotational axis 26, and the variable term is indicative of the shape of the workpiece.

The centering of the workpiece 22 on the rotational axis 26 of the spindle is accomplished by moving the workpiece on the support/holder 24 so that the constant term is reduced to zero. The variable term will remain even then, because it is related to the out-of-roundness of the workpiece 22.

To move the workpiece properly to accomplish centering, the roller bearings 66 of the centering head 29 are contacted to the periphery of the workpiece 22a, numeral 102, as illustrated in FIG. 1. The workpiece is pushed by the movement of the centering head 29 along the movement axis 38 and toward the rotational axis 26, numeral 104. The workpiece is pushed at the position on the periphery associated with the maximum value of the variable term, by a displacement of about the constant term. In the example of FIG. 7, the workpiece 22 is pushed from the direction indicated by the angular maximum position 84, by a displacement of about the magnitude 86.

This sequence of steps and the first pushing of the workpiece improves the centering of the workpiece relative to the rotational axis 26. To further improve the centering, the steps 98, 100, 102 and 104 may be repeated, as indicated at numeral 106. The second pushing reduces the remaining constant term even further and, desirably, to zero. Tests with a prototype apparatus indicate that the centering of the workpiece may be accomplished to a precision of about 0.1 to about 1 micrometer.

In the past, it has been known to attempt to center objects using a V-guide. Due to alignment and manufacturing tolerances of the V-guide, it has not been possible to achieve satisfactory tolerances on the centering using this approach. The use of the centering head 29 of the invention with the pivotable centering head 29 and its roller bearings 66 yields results superior to those which would be obtained using a V-guide or other configuration of a pusher. The combination of the pivoting of the swivel head and the rotation of the roller bearings allows the centering head 29 to be slightly misaligned from the movement axis 38, either by lateral displacement or angular displacement, and still function to yield centering within tolerances of less than about 1 micrometer. A V-guide type of pusher does not have this tolerance for misalignment. This tolerance for slight misalignment is important in the present application, where very precise centering is required. The precision of the centering may be better than achievable in the centering apparatus structure by conventional manufacturing operations, and therefore it could not be assumed that the centering apparatus itself has sufficient precision in its tolerances to meet the centering requirements.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A centering apparatus used in conjunction with a workpiece having a periphery, comprising:
   a workpiece spindle operable to rotate the workpiece about a rotational axis; and
   a centering head comprising
      a mount movable in a movement direction lying in a plane perpendicular to the rotational axis, the movement direction being generally a radial line extending outwardly from the rotational axis,
      a swivel head pivotably supported on the mount and pivotable about a pivot axis parallel to the rotational axis, the swivel head comprising
         a pair of bearings spaced apart along a direction lying generally perpendicular to the movement direction, each of the bearings having a bearing axis parallel to the rotational axis,
      a distance measuring device operable to measure a distance between the periphery of the workpiece and a measurement location on the mount as a runout curve as the workpiece is rotated-about the rotational axis, and
      a centering drive operable to contact the bearings to the workpiece and thereafter to move the mount and hence the workpiece along the movement direction responsive to the runout curve measured by the distance measuring device, until the workpiece is centered.

2. The centering apparatus of claim 1, wherein the workpiece is a glass lens.

3. The centering apparatusof claim 1, wherein the distance measuring device is supported on the mount.

4. The centering apparatus of claim 1, wherein the distance measuring device is an optical distance measuring device.

5. The centering apparatus of claim 1, wherein each of the bearings comprises a rotating bearing.

6. The centering apparatus of claim 1, wherein the centering drive is selected from the group consisting of a motor and a hand drive.

7. A centering apparatus for a workpiece having a periphery, comprising:
   a workplace spindle operable to rotate the workpiece about a rotational axis; and
   a centering head, comprising
      a mount movable in a movement direction lying in a plane perpendicular to the rotational axis, the movement direction being generally a radial line extending outwardly from the rotational axis, and
      a swivel head, comprising
         a central body, pivotably connected to the mount and pivotable about a pivot axis parallel to the rotational axis,
         a pair of arms extending outwardly on opposite sides of the body and parallel to the plane,
         a pair of rotating bearings, one of the bearings being mounted on each of the arms and having a bearing axis parallel to the rotational axis;
      a pivot structure extending between the mount and the central body of the pivot head, the pivot structure being operable to pivot the swivel head about the pivot axis parallel to the rotational axis; and
      a distance measuring device operable to measure the distance between the periphery of the workpiece and a measurement location on the mount, and
      a centering drive operable to contact the bearings to the workpiece and thereafter to move the mount along the movement direction responsive to the distance measuring device, until the workpiece is centered.

8. The centering apparatus of claim 7, wherein the distance measuring device is supported on the mount.

9. The centering apparatus of claim 7, wherein the distance measuring device is an optical distance measuring device.

10. The centering apparatus of claim 7, wherein the workpiece is a glass lens.

11. The centering apparatus of claim 7, wherein the centering drive is selected from the group consisting of a motor drive and a hand drive.

12. A method for centering a workpiece, comprising the steps of
   furnishing a workpiece having a periphery;
   providing a centering apparatus comprising
      a workpiece spindle operable to rotate the workpiece about a rotational axis; and
      a centering head comprising
         a mount movable in a movement direction lying in a plane perpendicular to the rotational axis, the movement direction being generally a radial line extending outwardly from the rotational axis, and
         a swivel head pivotably supported on the mount and pivotable about a pivot axis parallel to the rotational axis, the swivel head comprising a pair of bearings spaced apart along a direction lying generally perpendicular to the movement direction, each of the bearings having a bearing axis parallel to the rottional axis, a distance measuring device operable to measure the distance between the periphery of the workpiece and a measurement location on the mount;

mounting the workpiece on the spindle;

positioning the centering head at a location adjacent to the periphery of the workpiece;

rotating the spindle to rotate the workpiece;

positioning the centering head at a location adjacent to the periphery of the workpiece;

rotating the spindle to rotate the workpiece;

measuring a runout curve using the distance measuring device of the centering head, the runout curve having a constant term and a variable term;

moving the centering head along the movement direction until the bearings contact the workpiece; and centering the workpiece by pushing against the periphery of the workpiece with the bearings in a direction and by an amount so as to reduce the constant term of the runout curve toward zero.

13. The method of claim 12, including an additional step, after the step of pushing, of repeating the steps of rotating, measuring a runout curve, moving, and pushing.

14. The method of claim 12, wherein the step of pushing includes the step of pushing the workpiece at a location corresponding to about a maximum in the variable term of the runout curve, and by an amount of about the constant term of the runout curve.

15. The method of claim 12, wherein the step of furnishing the workpiece includes the step of furnishings a glass lens as the workpiece.

16. The method of claim 12, wherein the step of providing the centering apparatus includes the step of supporting the distance measuring device on the mount.

17. The method of claim 12, wherein the step of providing the centering apparatus includes the step of providing the distance measuring device as an optical distance measuring device.

\* \* \* \* \*